United States Patent Office

3,393,182
Patented July 16, 1968

3,393,182
PREVENTION OF COLD FLOW IN POLYMERS
OF CONJUGATED DIENES
William J. Trepka, Bartlesville, Okla., assignor to Phillips
Petroleum Company, a corporation of Delaware
No Drawing. Filed Feb. 23, 1965, Ser. No. 434,659
19 Claims. (Cl. 260—79.5)

ABSTRACT OF THE DISCLOSURE

Polymers of conjugated dienes are made by polymerizing monomers containing at least one conjugated diene with an organoalkali metal initiator. At the completion of the polymerization reaction, the polymerization reaction mixture is terminated with a reactive tin compound having reactive sites.

---

This invention relates to an improved process for preparing conjugated diene polymers. In one aspect it relates to a process for preventing or substantially reducing the tendency of certain conjugated diene polymers to cold flow. In another aspect it relates to polymers of conjugated dienes having a reduced tendency to cold flow.

In recent years there has been a great deal of research with the object of producing improved rubbery polymers of conjugated dienes. One of the products that has attracted wide-spread attention because of its superior properties is polybutadiene. The physical properties of these polymers are of such a nature that they are particularly suitable for the fabrication of automobile and truck tires and other articles for which conventional synthetic polymers have heretofore been comparatively unsatisfactory. However, it has been found that certain of the conjugated diene polymers, including copolymers of conjugated dienes and various other compounds such as vinyl-substituted aromatics, have a tendency to cold flow while in the unvulcanized or uncured state. Because of the tendency to cold flow, handling and processing of the unvulcanized polymers present many difficulties. In some instances, cracks or punctures in packages containing the uncured or unvulcanized polymer result in product loss or contamination as a result of the cold flow. While it is possible to cross link the molecules of the polymers, such as is done by conventional curing, in order to eliminate cold flow, this approach cannot be employed in cases where the polymers must later be compounded in masticating equipment. The formation of relatively large amounts of gel as a result of cross linking greatly reduces the ease with which the polymers can be mixed with other materials in fabricating. Accordingly, it is highly desirable to provide a method for reducing the tendency of these polymers to cold flow without increasing the difficulty of processing in conventional masticating equipment.

It is an object of this invention to provide an improved process for producing polymers of conjugated dienes that have a reduced tendency to cold flow.

Another object of this invention is to provide a process for producing polymers of conjugated dienes having improved processability.

Still another object of this invention is to provide improved jugated diene polymers having a reduced tendency to cold flow in the unvulcanized state and an improved processability.

Other aspects, advantages, and objects of this invention will become apparent to those skilled in the art upon consideration of the accompanying disclosure and claims.

The present invention is concerned with the production of improved conjugated diene polymers which have a reduced tendency to cold flow. Thus, the invention resides in an improvement in a process for polymerizing conjugated dienes with a catalyst system comprising an organo alkali metal compound. Broadly speaking, the improvements comprise the step of adding to the polymerization mixture a compound having the formula: $R_xSnZ_y$ wherein R is selected from the group consisting of saturated aliphatic, saturated cycloaliphatic, aromatic radicals, and combinations thereof, Z is selected from the group consisting of fluorine, chlorine, bromine, iodine, $$R'-CH=CH-CH_2-$$

$-OR''$, $-SR''$, $=O$, $=S$, $-O-R'''-O-$ and $-S-R'''-S-$ wherein R' is selected from the group consisting of hydrogen, saturated aliphatic, saturated cycloaliphatic and aromatic radicals and combinations thereof, R'' is selected from the group consisting of saturated aliphatic, saturated cycloaliphatic and aromatic radicals and combinations thereof, R''' is an alkylene radical with which the oxygen or sulfur and the tin atom forms a cyclic compound containing from 5 to 8 members in the ring and when Z is selected from the group fluorine, chlorine, bromine, iodine, $R'-CH=CH-CH_2-$, $-OR''$ and $-SR''$, $x$ is an integer from 0 to 2 and $y$ is an integer from 2 to 4 such that $x$ plus $y$ equals 4, and when Z is $=S$, $=O$, $-O-R'''-O-$ or $-S-R'''-S-$, $y$ is 1 and $x$ is 2. The number of carbon atoms in each of R, R' and R'' is in the range of 1 to 12. The number of carbon atoms in R''' is in the range 2 to 12. R, R' and R'' can be the same or different. It has been found that by adding the treating agent of this invention to the polymerization mixture, after the polymerization has been completed and prior to the inactivation of the catalyst, the rubbery product obtained has a reduced tendency to cold flow. The product also is processed very easily on conventional masticating and compounding equipment as described hereinafter.

Examples of the tin compounds that can be utilized in this invention are:

stannic fluoride
stannic chloride
stannic bromide
stannic iodide
tetraallyltin
methyltrichlorotin
di-n-hexyldifluorotin
dodecyltriiodotin
dodecyltrichlorotin
dicyclohexyldichlorotin
diphenyldibromotin
benzyltrichlorotin
4-tolyltrifluorotin
diethyldiallyltin
propyltriallyltin
diallyldichlorotin
dodecylallyldichlorotin
tetra(2-octenyl)tin
tetra(3-cyclopentyl)allyltin
dibutyldimethoxytin
tetramethoxytin
dibutylbis(octyloxy)tin
di(benzyloxy)diethyltin
tri(dodecoxy)cyclohexyltin di(cyclopentoxy)diphenyltin
tetradodecoxytin
dichlorodiphenoxytin
tetramethylthiotin
di(dodecylthio)diphenyltin
tri(butylthio)cyclopentyltin
di(benzylthio)didodecyltin
tri(cyclohexylthio)nonyltin
tetradodecylthiotin
dimethyltin oxide
di(3-diphenyl)tin oxide
dibutyltin oxide
dicyclohexyltin oxide
didodecyltin oxide
butylphenyltin oxide
dimethyltin sulfide
dibutyltin sulfide
di-p-biphenylyltin sulfide
didodecyltin sulfide
di-1-naphthyltinsulfide
dicyclopentyltin sulfide
2,2-dibutyl-5-methyl-1,3-dioxa-2-stannacyclopentane
2,2-diethyl-1,3-dioxa-2-stannacyclohexane
2,2-di(4-tolyl)-1,3-dioxa-2-stannacycloheptane
2-ethyl-2-phenyl-5-butyl-1,3-dioxa-2-stannacylohexane
2,2-dipropyl-1,3-dioxa-2-stannacyclooctane
2,2-dimethyl-1,3-dithia-2-stannacyclopentane
2,2-didodecyl-1,3-dithia-2-stannacyclohexane
2,2-diphenyl-4,5,6,7-tetramethyl-1,3-dithia-2-stanna-
 cycloheptane
2,2-dibutyl-4,4-dimethyl-1,3-dithia-2-stannacyclopentane Some of the above-mentioned tin compounds may exist in a polymeric form. When the tin compounds are in polymeric form, additional mechanical mixing steps known in the art may be required to insure intimate contact between the tin compound and the alkali metal terminated polymer.

The polymers which can be prepared according to this invention are broadly polymers of conjugated dienes, more specifically conjugated dienes containing from 4–12 carbon atoms per molecule, and preferably those which contain from 4–8 carbon atoms per molecule. Examples of these monomers include: 1,3-butadiene, isoprene, piperylene, 2,3-dimethyl-1,3-butadiene, 1,3-octadiene, 4,5-diethyl-1,3-octadiene, and the like. These conjugated dienes can be polymerized to form homopolymers or they can be copolymerized one with another. Conjugated dienes can also be copolymerized with one or more monovinyl-containing monomers such as styrene and alkyl styrenes, e.g., 3-methylstyrene, 3,5-diethylstyrene, 4-n-propylstyrene, 2,4,6-trimethylstyrene, 3-methyl-5-n-hexylstyrene, 2,3,4,5-tetramethylstyrene, 4-dodecylstyrene, 4-cyclohexylstyrene, 4-phenylstyrene, 4-p-tolylstyrene, and the like.

The conjugated dienes can also be copolymerized with other monovinyl-containing monomers such as: 1-vinylnaphthalene, 2-vinylnaphthalene, 4-methyl-1-vinylnaphthalene, 3-ethyl-2-vinylnaphthalene, 4,5-dimethyl-1-vinylnaphthalene, 4,5-diethyl-2-vinylnaphthalene, 6-isopropyl-1-vinylnaphthalene, 2,4-diisopropyl-1-vinylnaphthalene, 4-n-propyl-5-n-butyl-2-vinylnaphthalene, and the like. When copolymers of conjugated dienes and monovinyl-containing aromatic compounds are formed, it is preferred to have a major amount of conjugated dienes and a minor amount of the monovinyl-containing aromatic compounds in the polymerization system.

The polymers of the above-listed compounds are prepared by contacting the monomer or monomers which it is desired to polymerize with an organoalkali metal compound, including mono and polyalkali metal compounds in the presence of a hydrocarbon diluent. The organoalkali metal compounds preferably contain from 1 to 4 alkali metal atoms per molecule. While organometallic compounds of any of the alkali metals can be employed, organolithium compounds are preferred. The alkali metals include lithium, sodium, potassium, rubidium, and cesium.

The organoalkali metal compounds that are used as catalysts can be prepared in several ways, for example, by replacing halogens in an organic halide with alkali metals, by direct addition of alkali metals to a double bond, or by reacting an organic halide with a suitable alkali metal compound.

Suitable organoalkali metal initiators can be represented by the formula $RM_x$ wherein R is a hydrocarbon radical selected from the group consisting of aliphatic, cycloaliphatic, and aromatic radicals containing from 1 to 20 carbon atoms, M is an alkali metal, and $x$ is an integer from 1 to 4. The preferred initiators are organolithium compounds wherein $x$ is 1 or 2. Examples of the organoalkali metal compounds that can be used as catalysts include:

methyllithium
n-butyllithium
tert-butyllithium
amylpotassium
isopropylcesium
n-decyllithium
phenyllithium
1-naphthyllithium
1,4-dilithiobutane
1,5-dipotassiopentane
1,4-disodio-2-methylbutane
1,6-dilithiohexane
1,10-dilithiodecane
1,15-dipotassiopentadecane
1,20-dilithioeicosane
1,4-disodio-2-butene
1,4-dilithio-2-methyl-2-butene
1,4-dilithio-2-butene
1,4-dipotassio-2-butene
dilithionaphthalene
1,4-dilithiomethylnaphthalene
disodionaphthalene
4,4'-dilithiobiphenyl
disodiophenanthrene
dilithioanthracene
1,2-dilithio-1,1-diphenylethane
1,2-disodio-1,2,3-triphenylpropane
1,2-dilithio-1,2-diphenylethane
1,2-dipotassiotriphenylethane
1,2-dilithiotetraphenylethane
1,2-dilithio-1-phenyl-1-naphthylethane
1,2-dilithio-1,2-dinaphthylethane
1,2-disodio-1,1-diphenyl-2-naphthylethane
1,2-dilithiotrinaphthylethane
1,4-dilithiocyclohexane
2,4-disodioethylcyclohexane
3,5-dipotassio-n-butylcyclohexane
1,3,5-trilithiocyclohexane
1-lithio-4-(2-lithiomethylphenyl)butane
1,2-dipotassio-3-phenylpropane
1,2-di(lithiobutyl)benzene
1,3-dilithio-4-ethylbenzene
1,4-dirubidiobutane
1,8-dicesiooctane
1,5,12-trilithiododecane
1,4,7-trisodioheptane
1,4-di(1,2-dilithio-2-phenylethyl)benzene
1,2,7,8-tetrasodionaphthalene
1,4,7,10-tetrapotassiodecane
1,2-disodio-1,2-diphenylethane
dilithiophenanthrene
1,2-dilithiotriphenylethane
1,2-disodio-1,2-diphenylethane
dilithiomethane
1,4-dilithio-1,1,4,4-tetraphenylbutane
1,4-dilithio-1,4-diphenyl-1,4-dinaphthylbutane
and the like.

The amount of initiator used depends upon the organoalkali metal compound and the type of polymer desired. The effective initiator level is normally in the range of about 0.25 to 20 millimoles per 100 grams of monomer(s) charged to the polymerization system. Organoalkali metal initiators vary greatly in their solubility and this has a considerable effect on the amount used. Compounds which are very soluble in hydrocarbon diluents, such as butyllithium, amyllithium, and the like, are used in relatively small amounts, i.e., amounts in the lower portion of the specified range. Those which possess limited solubility can be used in larger amounts, the least soluble compounds being used in the larger quantities. In any event the initiator level is generally adjusted, together with the tin compound, to yield a polymer with an inherent viscosity in the range of 1.0 to 3.5.

It is preferred that the polymerization be conducted in the presence of a suitable diluent such as benzene, toluene, xylene, cyclohexane, methylcyclohexane, n-butane, n-hexane, n-heptane, isooctane, mixtures of these, and the like. Generally the diluent is selected from hydrocarbons, e.g., paraffins, cycloparaffins, and aromatics containing from 4 to 10 carbon atoms per molecule.

While the polymerization temperature can vary over a broad range, e.g., from −100 to 150° C., it is preferred to operate at a temperature in the range of −75 to 75° C. The period required for polymerization and for reaction of the tin compound with the polymer can range from about 5 minutes to 100 hours, although the time is ordinarily in the range of about 10 minutes to 25 hours.

Various materials are known to be destructive to organoalkali metal catalysts. These materials include carbon dioxide, oxygen, water, alcohols, mercaptans, and primary and secondary amines. It is highly desirable, therefore, that the monomers be freed of these materials as well as other materials which tend to inactivate the catalyst. Any of the well known means for removing such contaminants can be used. Also, it is preferred that the solvent mixture used in the process be substantially free of impurities such as water, oxygen, and the like. In this connection, it is desirable to remove air and moisture from the reaction vessel in which the polymerization is conducted. Any reactive impurities remaining in the reaction vessel or in the solvent mixture are removed by the organoalkali metal catalyst which serves as a scavenger.

By appropriate regulation of the catalyst level and the tin compound, products ranging from relatively low molecular weight, soft, easily processable rubbers to relatively high molecular weight polymers can be obtained. In cases where a high inherent viscosity rubber is desired, this invention is very useful in producing such a product without excessive cross linking and gel formation in such products. As stated hereinbefore, the process is concerned generally with preparing polymers having an inherent viscosity in the range of 1.0 to 3.5. However, the range is not to be construed to be unduly limiting.

Generally the amount of tin compound employed is in the range of 0.05 to 2 equivalents, based on the Z groups in the formula $R_xSnZ_y$, per gram atom of alkali metal in the initiator. The preferred range for the amount of tin compound to be added is from 0.5 to 2 equivalents, based on the Z groups in the formula $R_xSnZ_y$, per gram atom of alkali metal in the initiator. One equivalent of the reactive Z group per gram atom of alkalimetal in the catalyst is most preferred for maximum reduction in the cold flow and improvement in processability of the polymer.

As indicated above, one of the advantages of using this type of compound to reduce cold flow in the conjugated diene polymers is the improved processability of the polymer. It was unexpected to find that when the cold flow of conjugated diene polymers was decreased using the tin compounds of this invention, the processability of the treated polymer was not degraded. It is well known to reduce the tendency of polymers to cold flow by cross-linking but this usually produces a polymer that is very difficult to process. During milling operations in rubber compounding steps, the polymers produced according to this invention are very easily processed and give a final rubber stock which exhibits vulcanizate properties that are equivalent or superior to those of polymers that have not been treated to reduce cold flow using the tin compounds disclosed hereinbefore. I have found that polymers treated according to my invention having reduced tendency to cold flow, are characterized by a relatively high Mooney viscosity. Upon subsequent milling and compounding operations, when mildly acidic compounds are present, the Mooney viscosity decreases to a level whereby the polymer is very easily processed with conventional equipment.

The following examples are included to illustrate preferred embodiments of my invention. Material included in the examples should not be interpreted as unduly limiting the scope of the invention as hereinbefore described. Footnotes describing test procedures used in the examples are shown at the conclusion of Table XII.

EXAMPLE 1

The following recipe was employed in a series of runs for the preparation of polybutadiene containing carbon-tin bonds.

| | |
|---|---|
| 1,3-butadiene, parts by weight | 100 |
| Cyclohexane, parts by weight | 780 |
| n-Butyllithium, mmoles | Variable |
| Stannic chloride, mmoles | Variable |
| Time, hours | 3+16 |
| Temperature, ° F. | 122 |
| Conversion, percent | 100 |

Cyclohexane was charged first, the reactor was purged with nitrogen, and butadiene was added followed by the n-butyllithium. The temperature was maintained at 122° F. during polymerization. Conversion was quantitative after a 3-hour period. Stannic chloride was added and the temperature was maintained at 122° F. for 16 hours. The mixture was agitated throughout polymerization and stannic chloride treatment. A solution of 2,2′-methylene-bis(4-methyl-6-tert-butylphenol) in isopropyl alcohol was added in an amount to provide one part by weight per 100 weight parts rubber. The polymer was coagulated in isopropyl alcohol, separated, and dried. Inherent viscosity and cold flow were determined on the original and on the stannic chloride treated polymer. The original and the stannic chloride polymers were completely soluble in toluene, indicating that they were gel free. Results are presented in Table I. In the table, mhm.=millimoles per 100 grams monomer.

TABLE I

| BuLi Charged, mhm. | Effective BuLi Level,[1] mhm. | $SnCl_4$, mhm. | Original Polymer | | Stannic Chloride Terminated Polymer | |
|---|---|---|---|---|---|---|
| | | | Inh. Visc.[a] | Cold Flow, mg./min.[b] | Inh. Visc.[a] | Cold Flow, mg./min.[b] |
| 1.0 | 0.4 | 0.10 | 1.66 | 104 | 2.80 | 0 |
| 1.2 | 0.6 | 0.15 | 1.33 | 171 | 2.44 | 0 |
| 1.4 | 0.8 | 0.20 | 1.31 | 357 | 2.36 | 0 |
| 1.6 | 1.0 | 0.25 | 1.12 | 613 | 2.18 | 0 |
| 1.8 | 1.2 | 0.30 | 1.06 | 552 | 1.88 | 0 |

[1] Assumed scavenger level, 0.6 millimole.
For footnotes a and b, see compilation following Table XII.

The data show that stannic chloride is a very effective agent for reducing cold flow of polybutadiene prepared in the presence of n-butyllithium.

Milling characteristics of the polymers from runs 1, 2, 3 and 5 were studied by milling them on a roll mill. Different acidic-type materials were added, except in one run, to aid in the processing. Results are summarized in Table II. In the table, phr.=parts by weight per 100 parts by weight polymer.

TABLE II

| Polymer from Run | Original Polymer, ML-4 at 212° F.c | Milled Polymer | | | |
|---|---|---|---|---|---|
| | | Mill Temp., °F. | Reagent Added | | ML-4 at 212° F. After 10 min. Milling c |
| | | | Type | Phr. | |
| 1 | 73 | Cold | SnCl$_4$·5H$_2$O | 2 | 58 |
| 2 | 63 | 240 | Stearic acid | 5 | 49 |
| 3 | 69 | 240 | SnCl$_4$·5H$_2$O | 2 | 9 |
| 5 | 61 | 240 | | | 51 |

For footnote c, see compilation following Table XII.

The data show that the polymers exhibited considerable breakdown on the mill. A significant decrease in Mooney occurred in run 5 in which no processing aid was added but there was a considerably greater reduction when either stannic chloride or stearic acid was present.

EXAMPLE II

A series of runs was made in which butadiene was polymerized in the presence of variable amounts of n-butyllithium. Quantitative conversion was obtained after polymerization at 122° F. for three hours. Tetraallyltin was then added and the mixture was agitated for 16 hours while the temperature was maintained at 122° F. Otherwise the recipe and procedure were the same as in Example I. Control samples were withdrawn at each catalyst level and terminated with isopropyl alcohol (not in compound used). Inherent viscosity and cold flow were determined on each polymer and Mooney values were determined on the polymers treated with tetraallyltin. The polymers were completely soluble in toluene, indicating that they were gel free. Results are presented in Table III.

TABLE IV

| | Control | SnCl$_4$ Terminated |
|---|---|---|
| Compounding Recipe, Parts by Weight: | | |
| Polybutadiene | 100 | 100 |
| High abrasion furnace black | 50 | 50 |
| Zinc oxide | 3 | 3 |
| Stearic acid | 1 | 1 |
| Flexamine [1] | 1 | 1 |
| Resin 731 D [2] | 5 | 5 |
| Aromatic oil | 5 | 5 |
| Sulfur | 1.75 | 1.75 |
| NOBS Special [3] | 1.3 | 1.2 |
| Raw Polymer Properties: | | |
| ML-4 at 212° F.c | 33.0 | 51.5 |
| Cold flow, mg./min.b | 1.5 | 0 |
| Inherent viscosity a | 1.95 | 2.37 |
| Processing Properties: | | |
| Compounded ML-4 at 212° F.c | 57.5 | 55.5 |
| Extrusion at 250° F.: d | | |
| Inches/min | 43.0 | 63.0 |
| Grams/min | 99.5 | 105.0 |
| Rating (Garvey die) | 11 | 11 |
| Physical Properties, Cured 30 Minutes at 307° F.: | | |
| V$_r$e | 0.349 | 0.369 |
| 300% Modulus, p.s.i.f | 1,170 | 1,590 |
| Tensile, p.s.i.f | 2,190 | 2,330 |
| Elongation, percent f | 445 | 375 |
| Δ T, °F.g | 64.7 | 48.3 |
| Resilience, percent h | 67.3 | 75.9 |
| Shore A hardness i | 60.5 | 62.5 |
| Gehman freeze point, °C.j | −91 | −92 |

[1] Physical mixture containing 65 percent of a complex diarylamine-ketone reaction product and 35 percent of N,N'-diphenyl-p-phenylenediamine.
[2] Disproportionated pale rosin stable to heat and light.
[3] N-oxydiethylene-2-benzothiazyl sulfenamide.
For footnotes a–j, see compilation following Table XII.

Even though the control polymer had the lowest Mooney value of the two polymers, the processing properties were not as good as the 51.5 Mooney stannic chloride treated polymer. The stannic chloride treated polymer exhibited no cold flow and the vulcanizate had higher modulus, tensile strength, and resilience and lower heat build-up than the control polymer.

EXAMPLE IV

The recipe of Example I, run 2 was employed for the polymerization of butadiene in the presence of n-butyl-

TABLE III

| BuLi Charged, mhm. | Effective BuLi Level,[1] mhm. | Tetra-allyltin, mhm. | Control Polymer | | Tetraallyltin Terminated Polymer | | |
|---|---|---|---|---|---|---|---|
| | | | Inh. Visc.a | Cold Flow, mg./min.b | Inh. Visc.a | Cold Flow, mg./min.b | ML-4 at 212° F.c |
| 1.0 | 0.4 | 0.1 | | | 2.46 | 0.3 | 61.2 |
| 1.2 | 0.6 | 0.15 | | | 2.07 | 4.3 | 37.2 |
| 1.4 | 0.8 | 0.20 | | | 1.91 | 6.9 | 28.9 |
| 1.6 | 1.0 | 0.25 | | | 1.78 | 6.8 | 27.2 |
| 1.8 | 1.2 | 0.30 | | | 1.61 | 7.8 | 22.8 |
| 1.0 | 0.4 | | 1.78 | 82.4 | | | |
| 1.2 | 0.6 | | 1.45 | 165.7 | | | |
| 1.4 | 0.8 | | 1.30 | 312.2 | | | |
| 1.6 | 1.0 | | 1.21 | 600.1 | | | |
| 1.8 | 1.2 | | 1.01 | 779.8 | | | |

[1] As in Table I.
For footnotes a, b, and c, see compilation following Table XII.

These data show that tetraallyltin was very effective in reducing the cold flow of polybutadiene prepared in the presence of an organolithium catalyst.

EXAMPLE III

A run was made using the recipe and procedure of run 2 of Example I. Quantitative conversion was obtained. The polymer was completely soluble in toluene, indicating that it was gel free. The polymer was compounded in a tread stock recipe, cured 30 minutes at 307° F. and physical properties determined. A commercial polybutadiene rubber prepared in the presence of an organolithium catalyst was used as a control. Data are presented in Table IV.

lithium. Quantitative conversion was obtained in each run. Stannic chloride was added in the first run as previously described but in a second run it was replaced with an equivalent amount (0.15 millimole) of germanium tetrachloride. Both products had zero cold flow. Inherent viscosity and gel were determined on the original polymers. Stearic acid (3 phr.) was milled into each polymer on a roll mill at 240° F. The milling time was 3 minutes. Inherent viscosity and gel were again determined. The polymers containing stearic acid were then put into a press and heated in the absence of air for 6 minutes at 340° F. Inherent viscosity and gel were again determined. Results are reported in Table V.

TABLE V

|  | SnCl₄ Treated | GeCl₄ Treated |
|---|---|---|
| Inherent viscosity: a |  |  |
| Original polymer | 2.80 | 2.78 |
| After incorporation of stearic acid | 2.83 | 2.82 |
| After hot press treatment | 1.90 | 2.78 |
| Gel, percent: k |  |  |
| Original polymer | 0 | 0 |
| After incorporation of stearic acid | 0 | 0 |
| After hot press treatment | 0.3 | 5 |

For footnotes a and k, see compilation following Table XII.

These data show that germanium tetrachloride did not improve the processability of the polymers, as evidenced by no change in inherent viscosity even after the hot press treatment. The polymer treated with stannic chloride did not appear to undergo any change when milled under the conditions employed but a significant decrease in inherent viscosity occurred when it was heated in a press in the absence of air for 6 minutes. This change is indicative of cleavage of carbon-tin bonds.

EXAMPLE V

A series of runs was made for the preparation of butadiene/styrene block copolymers using variable amounts of n-butyllithium as the catalyst. Conversion was quantitative in all cases. After a six-hour reaction period, stannic chloride was added in half the runs, the others being reserved as controls. After continuing the reactions for 16 more hours, the products were recovered as in Example I. The following polymerization recipe was used:

1,3-butadiene, parts by weight _____ 75
Styrene, parts by weight _____ 25
Cyclohexane, parts by weight _____ 780
n-Butyllithium, mmoles _____ Variable
Stannic chloride, mmoles _____ Variable
Time, hours _____ 6+16
Temperature, °F. _____ 122

Cyclohexane was charged to the reactor first after which it was purged with nitrogen. Styrene was added followed by the butadiene and then the butyllithium. Data are summarized in Table VI.

TABLE VI

| BuLi Charged, mhm. | Effective BuLi Level,¹ mhm. | SnCl₄ mhm. | Inh. Visc.ᵃ | ML-4 at 212° F.ᶜ |
|---|---|---|---|---|
| 1.6 | 1.0 | 0 | 1.09 | 79.0 |
| 1.8 | 1.2 | 0 | 0.90 | 47.0 |
| 2.0 | 1.4 | 0 | 0.98 | 51.5 |
| 1.6 | 1.0 | 0.25 | 1.83 | 87.0 |
| 1.8 | 1.2 | 0.30 | 1.69 | 73.0 |
| 2.0 | 1.4 | 0.35 | 1.47 | 56.0 |

¹ As in Example I.
For footnotes a and c, see compilation following Table XII.

EXAMPLE VI

Two runs were made in the same manner as runs 5 and 6 of Example V. These polymers were prepared for evaluation purposes. Following are data on polymer preparation:

|  | 1 | 2 |
|---|---|---|
| n-Butyllithium charged, mhm | 1.8 | 2.0 |
| SnCl₄, mhm | 0.30 | 0.35 |
| Conversion, percent | 100 | 100 |

The polymers were compounded in an electrical insulation formulation together with a butadiene/styrene block copolymer prepared in a similar manner but without treatment with stannic chloride. Raw polyer properties, processing properties, and physical properties of the vulcanizates were determined. The polymers were completely soluble in toluene, indicating that they were gel free. Data are presented in Table VII.

TABLE VII

|  | Control | 1 | 2 |
|---|---|---|---|
| Compounding Recipe, Parts by Weight: |  |  |  |
| Polymer | 100 | 100 | 100 |
| Zinc oxide | 10 | 10 | 10 |
| Stearic acid | 10 | 10 | 10 |
| Agerite Stalite ¹ | 1.5 | 1.5 | 1.5 |
| Dixie Clay ² | 100 | 100 | 100 |
| Purecal-O ³ | 50 | 50 | 50 |
| Cumar MH 2½ ⁴ | 15 | 15 | 15 |
| Sulfur | 2 | 2 | 2 |
| Altax ⁵ | 1.5 | 1.5 | 1.5 |
| Methyl Zimate ⁶ | 0.5 | 0.5 | 0.5 |
| Raw Polymer Properties: |  |  |  |
| ML-4 at 212° F.ᶜ | 43 | 70 | 61 |
| Inherent Viscosity ᵃ |  | 1.81 | 1.71 |
| Processing Properties: |  |  |  |
| Compounded ML-4 at 212° F. ᶜ | 32.5 | 70 | 61.5 |
| Extrusion at 180° F.: ᵈ |  |  |  |
| Inches/min | 74.4 | 87.4 | 80.4 |
| Grams/min | 113 | 145 | 139 |
| Rating (Garvey die) ᵈ | 12 | 11 | 11 |
| Physical Properties, Cured 30 Minutes at 307° F.: |  |  |  |
| Compression set, percent ¹ | 66.8 | 34.3 | 38.8 |
| 200% Modulus, p.s.i. ᶠ | 690 | 690 | 740 |
| Tensile, p.s.i. ᶠ | 1,150 | 1,540 | 1,410 |
| Elongation, percent ᶠ | 665 | 715 | 690 |
| Shore A hardness ⁱ | 81 | 82 | 83 |

¹ Octylated diphenylamine.
² A hard-type, white-to-cream colored kaolin mineral filler.
³ Chemically precipitated CaCO₃; particle size, 0.15–0.30 micron; specific gravity 2.65.
⁴ Polymers of coumarone, indene, and associated coal-tar compounds; melting point 115–125° C.; minimum ash, 0.5%; specific gravity 15.5° C., 1.130.
⁵ Benzothiazyl disulfide.
⁶ Zinc dimethyldithiocarbamate.
For footnotes a, c, d, f, i, and l, see compilation following Table XII.

The data show that even though the polymers treated with stannic chloride had much higher compounded Mooney values than the control, they exhibited better processability as evidenced by the extrusion data. Compression set data show that they reached a much better state of cure than the control and had a much higher tensile strength.

EXAMPLE VII

A series of runs was made for the preparation of butadiene/styrene random copolymers using variable amounts of n-butyllithium as the catalyst. Conversion was quantitative in all cases. After a 1.5 hour reaction period, stannic chloride was added in all but one run and the reactions were continued for 1.5 more hours. The products were recovered as in Example I. The following polymerization recipe was used:

1,3-butadiene, parts by weight _____ 75
Styrene, parts by weight _____ 25
Cyclohexane, parts by weight _____ 780
Tetrahydrofuran, parts by weight _____ 1.5
n-Butyllithium, mmoles _____ 1.3
Stannic chloride, mmoles _____ Variable
Time, hours _____ 1.5+1.5
Temperature, °F. _____ 122

Cyclohexane was charged to the reactor first after which it was purged with nitrogen. Butadiene was added

TABLE VIII

| BuLi Charged, mhm. | Effective BuLi Level,¹ mhm. | SnCl₄, mhm. | Inh. Visc.ᵃ | ML-4 at 212° F.ᶜ | Milled at 230° F. with Stearic Acid | |
|---|---|---|---|---|---|---|
|  |  |  |  |  | Inh. Visc.ᵃ | ML-4 at 212° F.ᶜ |
| 1.3 | 0.7 |  | 1.50 | 27 | 1.51 | 21 |
| 1.3 | 0.7 | 0.12 | 2.25 | 76 | 1.96 | 62 |
| 1.3 | 0.7 | 0.14 | 2.33 | 90.5 | 2.24 | 75 |
| 1.3 | 0.7 | 0.18 | 2.75 | 115 | 2.33 | 90 |
| 1.3 | 0.7 | 0.23 | 2.61 | 112 | 2.43 | 88 |
| 1.3 | 0.7 | 0.35 | 2.51 | 109 | 2.22 | 80 |

¹ As in Example I.
For footnotes a and c, see compilation following Table XII.

followed by the styrene, then the tetrahydrofuran, and finally the n-butyllithium. The polymers were completely soluble in toluene. Data are presented in Table VIII.

Judging from inherent viscosity and Mooney data, the optimum effect of stannic chloride in the copolymer occurred when the millimoles of lithium and chlorine in the system were equivalent, i.e., a ratio of 1/1. Processability of the polymers was studied by milling 3 phr. of stearic acid into each polymer on a roll mill at 230° F. for 6 minutes and then determining inherent viscosity and Mooney values. These data, also presented in Table VIII, show that under the conditions employed, a reduction in inherent viscosity and Mooney values occurred upon milling the stannic chloride treated polymers.

EXAMPLE VIII

A series of runs was made in which polybutadiene containing carbon-tin bonds was prepared. The following recipe was used:

| | |
|---|---|
| 1,3-butadiene, parts by weight | 100 |
| Cyclohexane, parts by weight | 780 |
| n-Butyllithium, mmoles | 1.3 |
| Butyltrichloro tin | Variable |
| Time, hours | 3+3 |
| Temperature, °F. | 122 |
| Conversion, percent | 100 |

Cyclohexane was charged first, the reactor was purged with nitrogen, and butadiene was added followed by the n-butyllithium. The temperature was maintained at 122° F. during polymerization. Conversion was quantitative after a 3-hour period. Butyltrichlortin was added and the temperature maintained at 122° F. for 3 hours. The mixture was agitated through the polymerization and the butyltrichlorotin treatment. A solution of 2,2′-methylene-bis(4-methyl-6-tert-butylphenol) in isopropyl alcohol was added in an amount to provide one part by weight per hundred weight parts rubber. The polymer was coagulated in isopropyl alcohol, separated, and dried. Inherent viscosity and cold flow were determined on the original and butyltrichlorotin treated polymers. No gel was observed in any of the polymer samples. Results are presented in Table IX.

TABLE IX.—TERMINATION OF X-15 WITH BUTYLTRICHLOROTIN

| BuLi Charged, mhm.[1] | BuSnCl₃, mhm. | Before Termination, Inh. Visc. | After Termination Inh. Visc.[a] | After Termination ML-4 at 212° F.[c] | After Termination Cold Flow, mg./min.[b] |
|---|---|---|---|---|---|
| 1.3 | 0 | 1.31 | 1.28 | 3 | 449 |
| 1.3 | 0.065 | 1.25 | 1.54 | 10 | 90.0 |
| 1.3 | 0.130 | 1.31 | 1.79 | 21 | 5.88 |
| 1.3 | 0.230 | 1.30 | 1.98 | 46 | 0.08 |
| 1.3 | 0.350 | 1.35 | 2.29 | 94 | 0 |
| 1.3 | 0.460 | 1.24 | 2.16 | 84 | 0 |
| 1.3 | 0.490 | 1.39 | 1.96 | 53 | 0.52 |

[1] Assumed scavenger level, 0.6 millimole.
For footnotes a, b, and c, see compilation following Table XII.

These data show that butyltrichlorotin is very effective for reducing cold flow of polybutadiene prepared in the presence of n-butyllithium.

EXAMPLE IX

A series of runs was made using the same procedure as outlined in Example VIII except that the butyllithium was added in an amount of 1.25 millimoles. Instead of using butyltrichlorotin as a treating agent, dichlorodioctyltin was added. After the treated polymer samples were recovered, inherent viscosity, Mooney viscosity, and cold flow were determined. They were then milled at a temperature of 230–240° F. with three parts by weight per hundred weight parts rubber of stearic acid for 6 minutes. The following properties were determined:

TABLE X

| BuLi,[1] mhm. | R₂SnCl₂,[2] mhm. | Inherent Viscosity[a] Before Stearic Acid | Inherent Viscosity[a] After Stearic Acid | Inherent Viscosity[a] Change | Mooney ML-4 at 212° F.[c] Before Stearic Acid | Mooney ML-4 at 212° F.[c] After Stearic Acid | Mooney ML-4 at 212° F.[c] Change | Cold Flow[b] Before Stearic Acid | Cold Flow[b] After Stearic Acid | Cold Flow[b] Change |
|---|---|---|---|---|---|---|---|---|---|---|
| 1.25 | 0 | 2.07 | 1.84 | −0.23 | 23.0 | 17.5 | −5.5 | 29.7 | 29.0 | −0.7 |
| 1.25 | 0.20 | 2.42 | 2.07 | −0.35 | 49.0 | 33.5 | −15.5 | 12.3 | 12.8 | +0.5 |
| 1.25 | 0.25 | 2.75 | 2.19 | −0.56 | 80.6 | 43.0 | −37.6 | 9.17 | 4.83 | −4.34 |
| 1.25 | 0.35 | 2.61 | 2.18 | −0.43 | 73.9 | 42.0 | −31.9 | 9.63 | 5.10 | −4.53 |

[1] Assumed scavenger level, 0.6 millimole.
[2] Tin halide was added after three hours polymerization time. Reaction time was three hours.
For footnotes a, b, and c, see compilation following Table XII.

These data show that dichlorodioctyltin was effective for reducing the cold flow of polybutadienes prepared in the presence of n-butyllithium. The data also show that the polymers exhibited considerable breakdown on the mill. Significant decreases in the Mooney viscosity were observed when the polymers were milled with stearic acid. These data show the advantage of improved processability when tin compounds are used to reduce cold flow in polymers.

EXAMPLE X

A series of runs was made using the procedure outlined in Example VIII above. The only change was in the use of dibutyltinsulfide instead of butyltrichlorotin. After the polymer samples were recovered and the inherent viscosity, Mooney viscosity, and cold flow were determined, they were milled for 6 minutes at 230–240° F. with three parts by weight per hundred weight parts rubber of stearic acid. The results are reported in Table XI.

TABLE XI

| BuLi,[1] mhm. | R₂SnS,[2] mhm. | Inherent Viscosity[a] Before | Inherent Viscosity[a] After | Inherent Viscosity[a] Change | Mooney, ML-4 at 212° F.[c] Before | Mooney, ML-4 at 212° F.[c] After | Mooney, ML-4 at 212° F.[c] Change | Cold Flow, mg./min.[b] Before | Cold Flow, mg./min.[b] After | Cold Flow, mg./min.[b] Change |
|---|---|---|---|---|---|---|---|---|---|---|
| 1.3 | 0 | 1.86 | 1.68 | −0.18 | 18.5 | 14.0 | −4.5 | 54.5 | 75.0 | +20.5 |
| 1.3 | 0.30 | 2.35 | 2.06 | −0.29 | 49.5 | 33.5 | −16.0 | 22.8 | 18.8 | −4.0 |
| 1.3 | 0.35 | 3.10 | 2.47 | −0.63 | 105 | 61.0 | −44.0 | 6.70 | 7.05 | +0.35 |
| 1.3 | 0.40 | 2.82 | 2.39 | −0.43 | 82.0 | 60.0 | −22.0 | 8.53 | 14.2 | +5.67 |
| 1.3 | 0.50 | 2.58 | 2.29 | −0.29 | 67.0 | 49.5 | −17.5 | 9.03 | 10.4 | +1.37 |

[1] Assumed scavenger level, 0.5 milliomole.
[2] R₂SnS was added after 3 hours polymerization time; reaction time was an additional three hours.
For footnotes a, b, and c, see compilation following Table XII.

These data show that dibutyltinsulfide is effective in reducing the cold flow of polybutadiene prepared with a butyllithium catalyst. They also show that the resulting product is easily processed as evidenced by a substantial decrease in the Mooney viscosity upon milling.

EXAMPLE XI

The following recipe was employed in a series of runs for the preparation of polybutadiene containing carbon-tin bonds:

| | |
|---|---|
| 1,3-butadiene, parts by weight | 100 |
| Cyclohexane, parts by weight | 780 |
| n-Butyllithium, mmole[1] | 0.82 |
| Tin compound, mmole | 0.26 |
| Time, hours | 3 hrs. 25 min.+3 hrs. 20 min. |
| Temperature, °F. | 122 |
| Conversion, percent | Quantitative |

[1] Assumed scavenger level, 0.26 mmole; effective initiator level, 0.56 mmole.

The procedure for making the polymers was the same as in Example I. A control run was made in which no tin compound was used. The polymers were completely soluble in toluene. Results of inherent viscosity determinations are presented in the following table:

TABLE XII

| Run No. | Tin Compound | Inh. Visc.[a] |
|---|---|---|
| 1 | | 1.96 |
| 2 | Dibutyldimethoxytin [1] | 2.89 |
| 3 | Dibutyl(dilaurylthio)tin | 2.87 |
| 4 | 2,2-Dibutyl-5-methyl-1,3-dioxa-2-stannacyclopentane.[2] | 2.80 |

[1] Probably polymeric.
[2] Reaction product of dibutyldichlorotin and propylene glycol.
For footnote a, see compilation following this table.

FOOTNOTES

[a] Inherent viscosity was determined by placing one-tenth gram of polymer in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

[b] Cold flow, mg./min., was determined by extruding the rubber through a ¼-inch orifice at 3.5 p.s.i. pressure and a temperature of 50° C. (122° F.). After allowing 10 minutes to reach steady state, the rate of extrusion is measured and reported in milligrams per minute.

[c] Mooney viscosity, ML–4 at 212° F., was determined using procedure ASTM D–1646–61 (Mooney Viscometer, large rotor, 212° F., 4 minutes).

[d] Extrusion at 250° F. was determined using No. ½ Royle Extruder with Garvey die by the procedure described in Ind. Eng. Chem. 34, 1309 (1942). As regards to the "rating" figure, 12 designates an extruded product considered to be perfectly formed whereas lower numerals indicate less perfect products.

[e] Cross linking, $V_r$, is reported as the volume fraction of polymer in swollen stock, determined by method of Kraus as given in Rubber World, 135, 67–73, 254–260 (1956).

[f] Modulus, Tensile and Elongation were determined by the method of ASTM D–412–61T.

[g] Heat build-up, ΔT, °F., was determined by the ASTM D–623–58, Method A, using Goodrich Flexometer, 143 p.s.i. load, 0.175 inch stroke. The test specimen was a right cylinder 0.7 inch in diameter and 1 inch high.

[h] Resilience, percent, was determined by ASTM D–945–59 (modified) using a Yerzley oscillograph. The test specimen was a right cylinder 0.7 inch in diameter and 1 inch high.

[i] Shore A hardness was determined by ASTM D–1706–61, Shore Durometer, Type A.

[j] Gehman freeze point, °C., determined by ASTM D–1053–61 using a Gehman torsional apparatus. The test specimen was 1.625 inches long, 0.125 inch wide, and 0.077 inch thick. The angle of twist was measured at 5° C. intervals and the freeze point was obtained by extrapolation to zero twist.

[k] Gel, percent, was determined along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded, ¼-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was used for calibration of the cage. The weight of swelled gel when present is corrected by subtracting the cage calibration.

[1] Compression set, percent, was determined by ASTM D–395–61, Method B (modified). Compression devices were used with 0.325-inch spacers to give a static compression for the ½-inch pellet of 35 percent. Test run for 2 hours at 212° F. plus relaxation for 1 hour at 212° F.

These data show that treatment with the tin compounds gave a significant increase in inherent viscosity as in Example X.

As many possible embodiments may be made without departing from the scope thereof, it is understood that all matter herein set forth is to be interpreted as illustrative and not in a limiting sense.

I claim:

1. In a process for making a polymer wherein a polymerization mixture is formed by polymerizing monomers selected from the group consisting of conjugated dienes and conjugated dienes in admixture with vinyl substituted aromatic compounds, with an organo alkalimetal catalyst, the improvement which comprises terminating the polymerization reaction by adding to said polymerization mixture a compound having the formula $R_xSnZ_y$ wherein R is selected from the group consisting of saturated aliphatic, saturated cycloaliphatic and aromatic radicals, Z is selected from the group consisting of fluorine, chlorine, bromine, iodine, R'—CH=CH—CH$_2$—, —OR'', —SR'', =S, =O, —O—R'''—O— and —S—R'''—S—, wherein R' is selected from the group consisting of hydrogen, saturated aliphatic, saturated cycloaliphatic and aromatic radicals, R'' is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the nucleus, the number of carbon atoms in each of R, R' and R'' being in the range of 1 to 12, the number of carbon atoms in R''' being in the range of 2 to 12, when Z is selected from the group consisting of fluorine, chlorine, bromine, iodine, R'—CH=CH—CH$_2$—,

—OR'' and —SR'', x is an integer from 0 to 2 and y is an integer such that x+y=4, and when Z is selected from the group consisting of =S, —O, —O—R'''—O— and —S—R'''—S—, y is 1 and x is 2; and recovering a polymer having a reduced tendency to cold flow in the unvulcanized state.

2. In a process for making a polymer wherein a polymerization mixture is formed by polymerizing 1,3-butadiene with an organo alkalimetal catalyst, the improvement which comprises terminating the polymerization reaction by adding to said polymerization mixture a compound having the formula: $R_xSnZ_y$, wherein R is selected from the group consisting of saturated aliphatic, saturated cycloaliphatic and aromatic radicals, Z is selected from the group consisting of fluorine, chlorine, bromine, iodine, R'—CH=CH—CH$_2$—, —OR'', —SR'', =S, =O, —O—R'''—O— and —S—R'''—S—, wherein R' is selected from the group consisting of hydrogen, saturated aliphatic, saturated cycloaliphatic and aromatic radicals, R'' is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the nucleus, the number of carbon atoms in each of R, R', and R'' being in the range of 1 to 12, the number of carbon atoms in R''' being in the range of 2 to 12, when Z is selected from the group consisting of fluorine, chlorine, bromine, iodine, R'—CH=CH—CH$_2$—, —OR", and —SR"', $x$ is an integer from 0 to 2 and $y$ is an integer such that $x+y=4$, and when Z is selected from the group consisting of =S, =O, —O—R'''—O— and —S—R'''—S—, $y$ is 1 and $x$ is 2; and recovering a polymer having a reduced tendency to cold flow in the unvulcanized state.

3. In a process for making a polymer wherein a polymerization mixture is formed by polymerizing 1,3-butadiene and styrene with an organo alkalimetal catalyst, the improvement which comprises terminating the polymerization reaction by adding to said polymerization mixture a compound having the formula R$_x$SnZ$_y$, wherein R is selected from the group consisting of saturated aliphatic, saturated cycloaliphatic and aromatic radicals, Z is selected from the group consisting of fluorine, chlorine, bromine, iodine, R'—CH=CH—CH$_2$—, —OR", —SR"', =S, =O, —O—R'''—O— and —S—R'''—S—, wherein R' is selected from the group consisting of hydrogen, saturated aliphatic, saturated cycloaliphatic and aromatic radicals, R" is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the nucleus, the number of carbon atoms in each of R, R' and R" being in the range of 1 to 12, the number of carbon atoms in R''' being in the range of 2 to 12, when Z is selected from the group consisting of fluorine, chlorine, bromine, iodine, R'—CH=CH—CH$_2$—, —OR", and —SR", $x$ is an integer from 0 to 2 and $y$ is an integer such that $x+y=4$, and when Z is selected from the group consisting of =S, =O, —O—R'''—O— and

$y$ is 1 and $x$ is 2; and recovering a polymer having a reduced tendency to cold flow in the unvulcanized state.

4. In a process for making a polymer wherein a polymerization mixture is formed by polymerizing 1,3-butadiene in the presence of a hydrocarbon diluent with an organolithium catalyst, said polymerization occurring at a temperature in the range of —100 to 250° F. and at a pressure sufficient to maintain said polymerization mixture substantially in the liquid phase, the improvement which comprises terminating the polymerization reaction by adding to said polymerization mixture a compound having the formula R$_x$SnZ$_y$, wherein R is selected from the group consisting of saturated aliphatic, saturated cycloaliphatic and aromatic radicals, Z is selected from the group consisting of fluorine, chlorine, bromine, iodine,

R'—CH=CH—CH$_2$—,

—OR", —SR", =S, =O, —O—R'''—O— and

—S—R'''—S—, wherein R' is selected from the group consisting of hydrogen, saturated aliphatic, saturated cycloaliphatic and aromatic radicals, R" is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the nucleus, the number of carbon atoms in each of R, R', and R" being in the range of 1 to 12, the number of carbon atoms in R''' being in the range of 2 to 12, when Z is selected from the group consisting of fluorine, chlorine, bromine, iodine, R'—CH=CH—CH$_2$—, —OR", and —SR", $x$ is an integer from 0 to 2 and $y$ is an integer such that $x+y=4$, and when Z is selected from the group consisting of =S, =O, —O—R'''—O— and —S—R'''—S—, $y$ is 1 and $x$ is 2; said compound being added in the range of 0.05 to 2 equivalents of component Z per equivalent of lithium in the catalyst; and recovering a polymer having a reduced tendency to cold flow in the unvulcanized state.

5. In a process for making a polymer wherein a polymerization mixture is formed by polymerizing 1,3-butadiene and styrene in the presence of a hydrocarbon diluent with an organolithium catalyst, said polymerization occurring at a temperature in the range of —100 to 250° F. and at a pressure sufficient to maintain said polymerization mixture substantially in the liquid phase, the improvement which comprises terminating the polymerization reaction by adding to said polymerization mixture a compound having the formula: R$_x$SnZ$_y$, wherein R is selected from the group consisting of saturated aliphatic, saturated cycloaliphatic and aromatic radicals, Z is selected from the group consisting of fluorine, chlorine, bromine, iodine, R'—CH=CH—CH$_2$—, —OR", —SR", =S, =O, —O—R'''—O— and —S—R'''—S—, wherein R' is selected from the group consisting of hydrogen, saturated aliphatic, saturated cycloaliphatic and aromatic radicals, R" is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the nucleus, the number of carbon atoms in each of R, R' and R" being in the range of 1 to 12, the number of carbon atoms in R''' being in the range of 2 to 12, when Z is selected from the group consisting of fluorine, chlorine, bromine, iodine, R'—CH=CH—CH$_2$—, —OR", and —SR", $x$ is an integer from 0 to 2 and $y$ is an integer such that $x+y=4$, and when Z is selected from the group consisting of =S, =O, —O—R'''—O— and —S—R'''—S—, $y$ is 1 and $x$ is 2; said compound being added in the range of 0.05 to 2 equivalents of component Z per equivalent of lithium in the catalyst; and recovering a polymer having a reduced tendency to cold flow in the unvulcanized state.

6. A process of claim 4 in which said compound is stannic chloride.

7. A process of claim 4 in which said compound is tetraallyltin.

8. A process of claim 4 in which said compound is butyltrichlorotin.

9. A process of claim 4 in which said compound is dichlorodioctyltin.

10. A process of claim 4 in which said compound is dibutyltin sulfide.

11. A process of claim 5 in which said compound is stannic chloride.

12. A process of claim 4 in which said organolithium catalyst is n-butyllithium.

13. A process of claim 5 in which said organolithium catalyst is n-butyllithium.

14. A process of claim 4 in which said compound is dibutyldimethoxytin.

15. A process of claim 4 in which said compound is dibutyl(dilaurylthio)tin.

16. A process of claim 4 in which said compound is 2,2-dibutyl-5-methyl-1,3-dioxa-2-stannacyclopentane.

17. The polymer prepared by the process of claim 1.
18. The polymer prepared by the process of claim 4.
19. The polymer prepared by the process of claim 5.

References Cited

UNITED STATES PATENTS

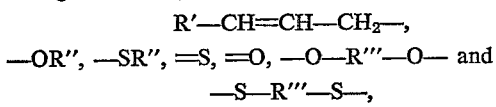

3,225,122   12/1965   Stumpe _____ 260—85.1
3,236,821   2/1966    Strobel _____ 260—79.5

JOSEPH L. SCHOFER, *Primary Examiner.*

D. K. DENENBERG, *Assistant Examiner.*